(12) United States Patent
Dunsmore et al.

(10) Patent No.: US 8,295,204 B2
(45) Date of Patent: Oct. 23, 2012

(54) METHOD AND SYSTEM FOR DYNAMIC ASSIGNMENT OF NETWORK ADDRESSES IN A COMMUNICATIONS NETWORK

(75) Inventors: Richard J. Dunsmore, McKinney, TX (US); Albert V. Smith, Jr., Richardson, TX (US); Man Wing Fong, Plano, TX (US); Joseph K. Nguyen, Flower Mound, TX (US); Su Wang, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 372 days.

(21) Appl. No.: 12/035,612

(22) Filed: Feb. 22, 2008

(65) Prior Publication Data
US 2009/0213763 A1 Aug. 27, 2009

(51) Int. Cl.
*H04L 12/28* (2006.01)
(52) U.S. Cl. ........ 370/258; 370/254; 709/220; 709/222; 709/245; 709/251
(58) Field of Classification Search .................. None
See application file for complete search history.

(56) References Cited

U.S. PATENT DOCUMENTS

| | | | | |
|---|---|---|---|---|
| 5,790,548 A * | 8/1998 | Sistanizadeh et al. | ........ | 370/401 |
| 5,835,725 A * | 11/1998 | Chiang et al. | ................ | 709/228 |
| 6,018,771 A * | 1/2000 | Hayden | ......................... | 709/231 |
| 6,115,545 A * | 9/2000 | Mellquist | ...................... | 709/220 |
| 6,212,161 B1 * | 4/2001 | Regula | .......................... | 370/223 |
| 6,219,715 B1 * | 4/2001 | Ohno et al. | .................... | 709/245 |
| 6,496,511 B1 * | 12/2002 | Wang et al. | ................... | 370/401 |
| 6,671,720 B1 * | 12/2003 | Cheston et al. | ............... | 709/222 |
| 6,856,620 B1 | 2/2005 | Dunsmore et al. | ........... | 370/389 |
| 7,499,445 B2 * | 3/2009 | Previdi et al. | ................ | 370/351 |
| 7,779,093 B1 * | 8/2010 | Zhang et al. | .................. | 709/221 |
| 2002/0112076 A1 * | 8/2002 | Rueda et al. | .................. | 709/245 |
| 2002/0131410 A1 * | 9/2002 | Erasmy et al. | ............... | 370/389 |
| 2003/0061384 A1 * | 3/2003 | Nakatani | ....................... | 709/245 |
| 2003/0093561 A1 * | 5/2003 | Christian et al. | .............. | 709/245 |
| 2003/0154285 A1 * | 8/2003 | Berglund et al. | ............. | 709/227 |
| 2003/0223749 A1 * | 12/2003 | Funk et al. | ....................... | 398/59 |
| 2005/0027778 A1 * | 2/2005 | Dimitrelis et al. | ............ | 709/200 |
| 2005/0185625 A1 * | 8/2005 | Sakaguchi et al. | ............ | 370/338 |
| 2005/0198251 A1 * | 9/2005 | Toda | ............................. | 709/223 |
| 2006/0045098 A1 * | 3/2006 | Krause | .......................... | 370/396 |

(Continued)

OTHER PUBLICATIONS

Droms, R., RFC 2131 Dynamic Host Configuration Protocol, Mar. 1997.*

*Primary Examiner* — Ayaz Sheikh
*Assistant Examiner* — Peter Chau
(74) *Attorney, Agent, or Firm* — Baker Botts L.L.P.

(57) ABSTRACT

According to a particular embodiment, a method for automatically assigning dynamic IP addresses without user interaction includes maintaining at least one pool of unused IP addresses. An advertisement message is transmitted from a first network element to at least one additional network element in a transport ring. The advertisement message identifies the first network element as providing IP address assignment services. The IP address request message from a second network element in the transport ring is received at the first network element. In response to the IP address request message, an IP address is dynamically assigned from the at least one pool of unused IP addresses. The dynamically assigned IP address is transmitted from the first network element to the second network element.

15 Claims, 3 Drawing Sheets

U.S. PATENT DOCUMENTS

| | | | |
|---|---|---|---|
| 2006/0067265 A1* | 3/2006 | Chen et al. | 370/328 |
| 2006/0168280 A1* | 7/2006 | Alexis | 709/230 |
| 2006/0184692 A1* | 8/2006 | Ikeda | 709/245 |
| 2006/0248230 A1* | 11/2006 | Kempf et al. | 709/245 |
| 2006/0259602 A1* | 11/2006 | Stewart et al. | 709/223 |
| 2007/0073850 A1* | 3/2007 | Callaghan et al. | 709/220 |
| 2007/0143449 A1* | 6/2007 | Wray West et al. | 709/219 |
| 2010/0280961 A1* | 11/2010 | Thyni | 705/80 |

\* cited by examiner

METHOD AND SYSTEM FOR DYNAMIC ASSIGNMENT OF NETWORK ADDRESSES IN A COMMUNICATIONS NETWORK

TECHNICAL FIELD OF THE INVENTION

The present invention relates generally to communications networks and, more particularly, to a method and system for the dynamic assignment of network addresses in a communications transport network.

BACKGROUND OF THE INVENTION

Communications systems are rapidly expanding in order to increase the amount of information that may be transported through those systems. These communications systems often include different types of networking equipment, such as optical networking equipment. An Optical network, such as a Synchronous Optical Network (SONET), often includes multiple network elements arranged in a ring. Each network element typically communicates directly with two other network elements in the ring, one network element in each direction of the ring. When one network element needs to communicate information to another network element, the first network element communicates the information to the second network element through any intermediate network elements in the ring.

In a network such as an optical network, network addresses are statically provisioned at each network element when the network element is brought into service. Such provisioning is performed manually by network administrators as part of the turn-up procedure. After manually assigning the IP addresses, the network administrators then administer and track the addresses assigned to the various network elements in the network using spreadsheets and other tools. The performance of these tasks is labor dependent and, thus, prone to error.

In other network configurations, network addresses may be provisioned by a Dynamic Host Configuration Protocol (DHCP) server. However, DHCP servers are generally incompatible with optical networks since each network element must be able to connect directly to the DHCP server. Because most transport equipment will not support a direct connection to a DHCP server, it is not practical to use a DHCP server for the assignment of IP addresses to network elements in a transport network.

SUMMARY OF THE INVENTION

In accordance with the present invention, techniques for automatically assigning dynamic IP addresses without user interaction are provided. According to particular embodiments, these techniques enable IP addresses to be automatically and dynamically assigned to network elements.

According to a particular embodiment, a method for automatically assigning dynamic IP addresses without user interaction includes maintaining at least one pool of unused IP addresses. An advertisement message is transmitted from a first network element to at least one additional network element in a transport ring. The advertisement message identifies the first network element as providing IP address assignment services. The IP address request message from a second network element in the transport ring is received at the first network element. In response to the IP address request message, an IP address is dynamically assigned from the at least one pool of unused IP addresses. The dynamically assigned IP address is transmitted from the first network element to the second network element.

Embodiments of the invention may provide various technical advantages. One advantage may be that these techniques may include using an existing transport network infrastructure for the dynamic assignment of IP addresses to new network elements and end systems. In a particular embodiment, a network element without transport networks may operate as an IP address server. In another embodiment, a network element without transport network may operate as a gateway to an external IP address server. Certain of the techniques described herein utilize the embedded OSI infrastructure to automatically find, assign, and distribute IP addresses to network elements that need an IP address. Accordingly, the need for manual provisioning of IP addresses by a user is eliminated, and errors introduced through manual provisioning are reduced.

These techniques may also allow for the permanent assignment of IP addresses. In contrast to typical DHCP address assignments that are leased for a set period of time, dynamic IP address assignments may be permanent and remain with the network element or end system until explicitly released. In particular embodiments, each network element receiving a dynamically assigned IP address stores the assignment in non-volatile memory. As a result, IP address assignments may be able to survive network and network element resets.

Another advantage may be that any appropriate number of IP address servers may be incorporated into the network. Where desired, multiple network elements may be designated as IP address servers or as gateways to IP address servers. A further advantage may be that network elements and end systems may choose the IP address server and/or gateway from which it will be assigned an IP address. Additionally or alternatively, if there are multiple IP address servers in an area it may be possible to specify the IP address server from which a network element will receive a dynamically assigned IP address.

Another advantage may be that manually provisioned IP address assignments may be given higher priority than dynamic IP address assignments. Thus, when a user manually assigns an IP address assignment, the corresponding network element will request and obtain a dynamic address to replace the manually assigned IP address. Likewise, if a network element first obtains a dynamic address assignment from the IP address server and then a user manually provisions an address, the manually provisioned address may be given precedence. In such a case, the dynamic address may be returned to the address server for reassignment.

Another advantage may be that the dynamic assignment of IP address assignments may be backward compatible with network elements that are not yet OSI/IP compliant. Thus, the systems and processes described above may be compatible with hybrid networks that include network elements that are OSI/IP compliant and network elements that are not OSI/IP compliant. Accordingly, the described system and operations may, in particular embodiments, ease the transition form OSI to mixed OSI/IP networks. As a result, the time required to make a network IP capable may be decreased.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
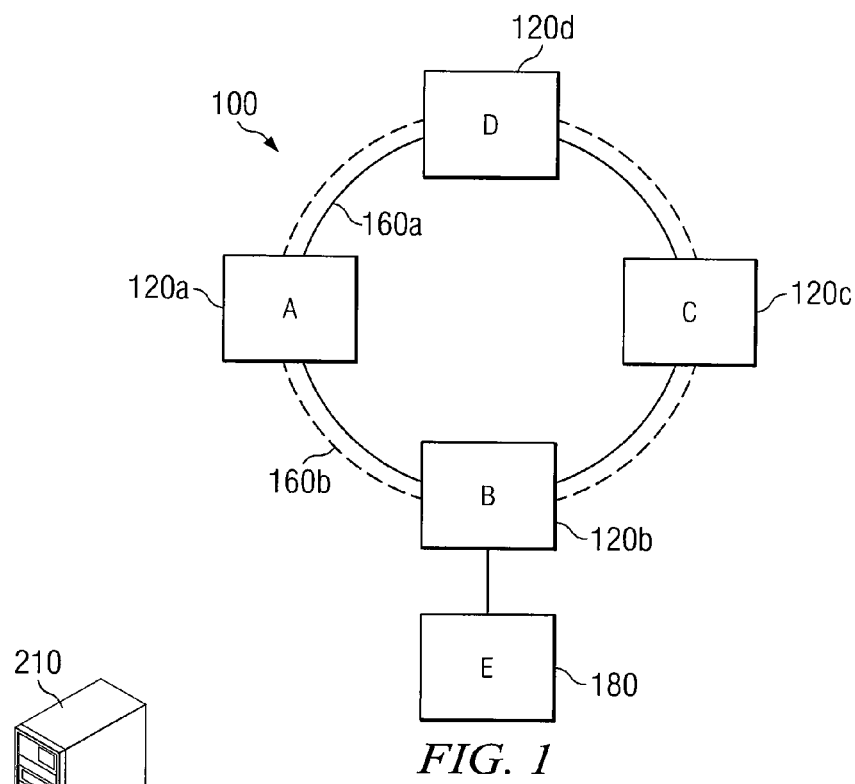
FIG. 1 illustrates an exemplary communication network that includes a network element operating as an IP address server for the dynamic assignment of addresses, in accordance with an embodiment of the present invention.

FIG. 1 illustrates a communication network, indicated generally at 100, that includes a plurality of network elements 120. In general, network 100 supports data transmission between network elements 120. According to particular embodiments, network 100 forms a communication ring. For example, where network 100 is an optical network, network 100 may form an optical communication ring and network elements 120 may include optical communication nodes. One such example network includes a Synchronous Optical Network (SONET). Although certain portions of this discussion may focus on a specific embodiment where network 100 and network elements 120 include optical equipment that are configured in an optical transport ring, it should be understood that the disclosed techniques may be used in any suitable type of network. For example, the present invention may be applied to any service transport layer product based on a transport layer 1 (TL1), Simple Network Management Protocol (SNMP), such as Plesichoronous Digital Hierarchy (PDH) and Synchronous Digital Hierarchy (SDH), and the like. For an OSI model structure, the present invention may be applied to any service layer.

Each network element 120 represents hardware, including any appropriate controlling logic, capable of linking to other network equipment and transmitting data. In operation, the ring configuration of network 100 permits any network element 120 to transmit data to any other network element 120 in network 100. Where network 100 forms a communication ring, as in the illustrated embodiment, network 100 may operate in clockwise and/or counterclockwise direction. Each network element 120 communicates directly with two other network elements 120 in the ring. As to adjacent network elements 120, data may be transmitted directly. As to nonadjacent network elements 120, data is transmitted by way of one or more intermediate network elements 120. For example, node 120a may transmit data directly to adjacent network elements 120b and 120d, but node 120a transmits data to nonadjacent node 120c by way of intermediate network elements 120b or 120d.

Network elements 120 are coupled to one another by transport medium 160. In operation, transport medium 160 transmits optical signals between network elements 120. Transport medium 160 may be a single unidirectional communication link, a single bi-directional communication link, or a plurality of uni- or bi-directional communication links. As illustrated, network 100 includes two unidirectional transport mediums 160a and 160b. Data transmitted clockwise through network 100 may be carried on transport medium 160a, while data transmitted counterclockwise over network 100 may be carried on transport medium 160b.

In particular embodiments, where network 100 is an optical network, the transport medium 160 may include one or more optical fibers. As such, the fibers may be made of material capable of transmitting optical signals having multiple wavelengths. Where appropriate, and by way of example only, network 100 may utilize wavelength division multiplexing (WDM), in which a number of optical channels are carried over a common path by modulating the channels by wavelength. However, it should be understood that network 100 may utilize any suitable multiplexing operation, and a channel represents any suitable separation of available bandwidth. Furthermore, network 100 may be any of various network types, including a Metropolitan Area Network (MAN).

When communication traffic is transmitted from a network element 120, the data is "flooded" through network 100 to ensure that all network elements 120 receive the same copy of the information. In a particular embodiment, a link state routing protocol (LSP) such as Intermediate System-Intermediate System (IS-IS) as provided by the International Organization for Standardization (ISO) may be used to perform flooding of topology and other information. The protocol uses a link state algorithm tailored to the requirements of the network. Generally, every network element 120 in network 100 retransmits a message when the network element 120 receives the first copy of the message. Accordingly, when network element 120a receives an LSP protocol data unit (PDU) from network element 120d, network element 120a retransmits the LSP PDU to network element 120d.

Each network element 120a-d that form the communication or transport ring may be termed an Intermediate System (IS). An IS comprises a network element that provides an Open System Interconnection—Reference Model (OSI-RM) Network Layer relay function in which data received from one corresponding network entity is forwarded to another corresponding network entity. In particular embodiments, however, network 100 may additionally include one or more end systems 180 that include network elements outside the communication that includes an IS ring. Although in communication with one or more network elements 120a-d, end systems 180 do not participate in the flooding of data. Specifically, where IS-IS routing protocol is used to exchange data between network elements 120a-d, an end system 180 does not receive such LS PDU messages. Rather, end system 180 connects to the IS using an End System-Intermediate System protocol to exchange information. End system 180 has no routing information and discovers an IS by listening for Intermediate System Hellos (ISHs) that are received from a network element (such as network element 120b in FIG. 1) in communication with end system 180. Likewise, end system 180 sends End System Hellos (ESHs). Thus, the IS discovers the end system 180 by listening to ESHs, and the IS sends ISHs to end system 180 identifying itself to the end system 100.

When a network element 120*a-d* or end system 180 is added to network 100, a "turn-up" procedure is performed to bring the network element 120 or end system 180 online. The turn-up procedure is typically performed by a network administrator who configures various performance characteristics of each new network element 120 or end system 180. Certain of the turn-up procedures may be performed automatically by a provisioning engine or other network component. The turn-up procedure may include such processes as determining performance characteristics for the network elements, determining connection and transport parameters, and querying network elements 120 and end systems 180 to validate configuration information.

Additionally, the turn-up procedure may include the assignment of a network address to a new network element 120 or end system 180. For example, where network element 120 comprises an OSI device, a NSAP may be assigned. Where network element 120 comprises an IP device, an IP address may be assigned. Likewise, where end system 180 comprises an IP device, an IP address may be assigned. The network address is unique to the particular network element and may be used to uniquely identify the network element 120 or end system 180. Additionally, the network address may be used as a destination address for communications directed to a network element 120 or end system 180. Communications intended for a network element 120 or end system 180 may include the unique network address for that network element.

Whereas prior systems required network addresses to be statically and manually assigned by a network administrator when the network element 120 or end system 180 was brought into service, system 100 operates to automatically and dynamically provision a network address to each network element 120 and end system 180.

In the embodiment illustrated in FIG. 1, a network element 120 may be designated as an IP address server. Although it may be desirable for a gateway network element to be selected as the IP address server, it is not necessary that the IP address server comprise a gateway network element. As the designated IP address server, network element 120*d* may maintain one or more pools of IP addresses to be used in network 100. In a particular embodiment, network element 120*d* may maintain a first pool of IP addresses that may be designated for use in assignment to an Ethernet port connecting the gateway network element (network element 120*d*, in this example) to a WAN or other communication network. For example, the first pool of IP addresses may be designated for use in assignment to Local Communication Network (LCN) ports. A second pool of IP addresses may be designated for use in assignment of an Ethernet port for use by a user for locally accessing the network element for, for example, maintenance purposes. For example, the second pool of IP addresses may be designated for use in assignment to Local Management Ports (LMPs). Still another pool of IP addresses may be designated for use in assignment to other ports or components of a network element 120*a-d*. This third pool of IP addresses may be termed "Network Element Management (NEM) IP addresses," in one example embodiment. However, it is recognized that the IP addresses may include any type of suitable address and are not limited to those described above. For example, in a particular embodiment, a pool of addresses may be maintained for allocation as CP Node IP addresses. Additionally, although three pools are described here in, it is recognized that any number of appropriate pools may be maintained.

In operation, as the IP address server, network element 120*d* will transmit "IAmAnAddressServer" messages to network elements 120*a-c*. The ISH "IAmAnAddressServer" messages may include a Boolean variable that identifies to network elements 120 that network element 120*d* is designated as an address server capable of assigning IP addresses. As described above, network element 120*d* may use the LSP PDU protocol to transmit the "IAmAnAddressServer" message, in particular embodiments. The "IAmAnAddressServer" message will be transmitted to all network elements 120 that are in the IS of network element 120*d*.

When a new network element 120, such as client network element 120*a*, is turned up, new network element 120*a* may begin to accept LSP PDU messages from other network elements already in the IS. When the new network element 120*a* receives an "IAmAnAddressServer" message from network element 120*d*, new network element 120*a* may respond to the message by requesting an IP address from network element 120*d*. To obtain an IP address from network element 120*d*, new network element 120*a* formats and sends an IP request message to network element network element 120*d*. In particular embodiments, where for example, network 100 comprises an IP network, new network element 120*a* may send a Connectionless Network Protocol (CLNP) based Dynamic Host Configuration Protocol (DHCP) request. The IP request message identifies the origin of the IP request and, in some embodiments, may specify the type of IP address needed by new network element 120*a*. For example, new network element 120*a* may specify that an LCN, LMP, or NEM IP address is needed.

The IP address request messages is forwarded from new network element 120*a* to the IP address server, in this case network element 120*d*. Although in this particular example network element 120*a* communicates directly with network element 120*d*, in other examples network element 120*b* may represent the new network element. In such a case, the IP address request message originates from network element 120*b* and is communicated to network element 120*d* via communication path 160*a* or 160*b* through network elements 120*a* or 120*c*.

When network element 120*d* receives the IP address request message from the new network element 120*a* or 120*b*, network element 120*d* processes the message to identify the new network element 120*a* or 120*b* and to determine the type of IP address requested. Network element 120*d* then accesses the one or more pools of IP addresses and identifies an unused IP address that may be assigned to the new network element 120*a* or 120*b*. Network element 120*d* may maintain a list of assigned IP addresses in non-volatile memory. Using communication protocols such as those discussed above, network element 120*d* then transmits the new assigned IP address to the new network element 120*a* or 120*b*. Upon receiving the new assigned IP address, the new network element 120*a* or 120*b* is configured to automatically begin using the assigned IP address.

In the example described above, the new network element being "turned up is an IS. Accordingly, the new network element communicates with other network elements 120 in the transport ring using LSP. However, similar procedures may be used to "turn up" a network element that is an end system outside the transport ring. Although end system 180 does not participate in the flooding of data through the transport ring, end system 180 exchanges information with network element 120*b* using ES-IS protocol. Accordingly, network information received by network element 120*b* may be passed on to end system 180 using the ES-IS protocol.

In a particular embodiment, when network element 120*b* receives an "IAmAnAddressServer" message from network element 120*d*, network element 120*b* may take the Network Service Access Point (NSAP) address of the IP address Server and put the NSAP address into an ISH message transmitted from network element 120b to end system 180. For example, a new extension in the ISH PDU may be added to accommodate the NSAP address of network element 120d. By "listening" for ISH messages from network element 120b that identify network element 120d as an address server, end system 180 may discover that network element 120d is a designated IP address server offering assignment services. Upon receiving the NSAP address of network element 120d, end system 100 may then generate an IP address request message for transmission to network element 120d. The assignment of an IP address to end system 180 is carried out by network element 120d in the same general manner as described above with respect to network elements 120 within the IS.

Figure 2:
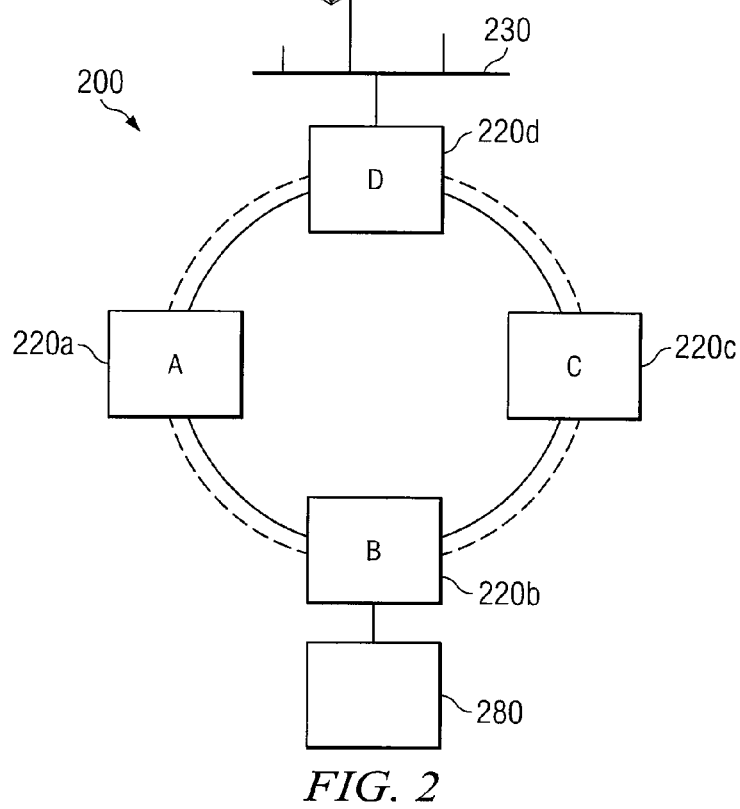
FIG. 2 illustrates an exemplary communication network that includes an IP address server in communication with the network for the dynamic assignment of addresses, in accordance with an alternative embodiment of the present invention.

FIG. 2 illustrates a communication network 200 that includes an external IP address server 210 in communication with network 200 for the dynamic assignment of addresses. Similar to network 100, network 200 supports data transmission between network elements 220 and forms a communication ring. Thus, network 200 may operate similar to that described above with respect to FIG. 1, and network elements 220 may also be configured to operate similar to network elements 120. Rather than designating a network element 220 to operate as an IP address server, however, network 200 includes as an external IP address server 210 in communication with network 200.

External IP address server 210 is coupled to network 200 by an external network 230. In a particular embodiment, external IP address server 210 may comprise a dynamic host configuration protocol (DHCP) server, and external network 230 may comprise a WAN. However, it is recognized that external IP address server 210 may include any server device that operates according to any suitable communication protocol. Likewise, external network 230 is not limited to a WAN and may include any communication network communicating data between IP address server 210 and network 200.

Communications received from and transmitted to network 200 are routed through a network element 220d. In a particular embodiment, network element 220d includes a gateway network element that operates as a Bootstrap Protocol (BOOTP) relay. However, it is recognized that any network element 220 may be designated for directing communications to and receiving communications from external IP address server 210. As will be described in more detail below, network element 220d receives IP address requests from network elements 220a-c and end system 18. Network element 220d relays the IP address requests to external IP address server 210 on behalf of network elements 220a-c and end system 18.

External IP address server 210 may maintain one or more pools of IP addresses to be used in network 200. For example, similar to the pools of addresses maintained by network element 120d in FIG. 1, external IP address server 210 may maintain a first pool of LCN IP addresses, a second pool of LMP IP addresses, and a third pool of NEM IP addresses, in a particular embodiment. However, it is recognized, however, that external IP address server 210 may maintain any appropriate number of pools of IP addresses and that such addresses may be of any suitable type.

In operation, as the gateway to the external IP address server 210, network element 220d will transmit advertisement messages to network elements 220a-c. The advertisement messages may include a Boolean variable that identifies to network elements 220 that network element 220d is designated as a gateway to an address server capable of assigning IP addresses. As described above, network element 220d may use the LSP PDU protocol to transmit the advertisement message, in particular embodiments. The advertisement message will be transmitted to all network elements 220 that are in the IS of network element 220d.

When a new network element 220, such as client network element 220, for example, is turned up, new network element 220a may begin to accept LSP PDU messages from other network elements 220 already in the IS. When the new network element 220a receives an advertisement message from network element 220d, new network element 220a may respond to the message by using network element 220d as a gateway to external IP address server 210. Specifically, new network element 220a may format and send an IP request message to network element 220d to obtain an IP address from external IP address server 210. In particular embodiments, where, for example, network 200 comprises an IP network, new network element 220a may send a Connectionless Network Protocol (CLNP) based Dynamic Host Configuration Protocol (DHCP) request. The IP request message identifies the requesting network element 220a and, in some embodiments, specifies the type of IP address needed by new network element 220a. For example, new network element 220a may specify that an LCN, LMP, or NEM IP address is needed. Alternatively, the request message may specify that a CP Node or other IP address is needed.

The IP address request messages is forwarded from new network element 220a to the IP server, in this case, via network element 220d, which is a BOOTP relay. Although in this particular example network element 220a communicates directly with network element 220d, it is recognized that the new network element may include any network element and may not directly communicate with network element 220d. For example, where network element 220b is the new network element, the IP address request message may be communicated to network element 220d via communication path 260a or 260b through network elements 220a or 220c.

When network element 220d receives the IP address request message from the new network element 220a or 220b, network element 220d relays the request message to external IP address server 210 for the new network element. External IP address server 210 then processes the request message to determine the identity of the new network element 220a or 220b and to determine the type of IP address requested. External IP address server 210 then accesses the one or more pools of IP addresses and identifies an unused IP address that may be assigned to the new network element 220a or 220d. Using communication protocols such as those discussed above, external IP address server 210 transmits the new assigned IP address to network element 220d, which then forwards the new assigned IP address through the transport ring to the new network element. Upon receiving the new assigned IP address, the new network element is configured to automatically begin using the assigned IP address.

Similar procedures may be used to "turn up" a network element comprising an end system 280. Like end system 180 of FIG. 1, end system 280 of FIG. 2 does not participate in the flooding of data through IS. However, end system 280 communicates with network element 220b using ES-IS protocol to exchange information. Network information received by network element 220b may be passed on to end system 280 using the ES-IS protocol. For example, in particular embodiments, when network element 220b receives an advertisement message from network element 220d, network element 220b may take the Network Service Access Point (NSAP) address of network element 220b and put the NSAP address into an ISH message transmitted from network element 220b to end system 280. In particular embodiments, a new extension in the ISH PDU may be added to accommodate the NSAP address of network element 220*d*. By "listening" for ISH messages from network element 220*b* that identify network element 220*d* as a gateway to an address server, end system 280 may discover that network element 220*d* is a gateway for communicating messages to a designated IP address server 210. Upon receiving the NSAP address of network element 220*d*, end system 280 may then generate an IP address request message for transmission to external IP address server 210 via network element 220*d*. The assignment of an IP address to end system 280 is carried out by external IP address server 210 in the same general manner as described above with respect to network elements 220 within the IS.

In the various embodiments described above with regard to FIGS. 1 and 2, a single network element operates as an IP address server. For example, in the embodiment of FIG. 1, network element 120*d* operates as the IP address server. As another example, in the embodiment of FIG. 2, external IP address server 210 is included for performing the dynamic assignment of IP addresses to network components. However, it is recognized that any number of IP address servers may service a transport network. Thus, multiple network elements may be designated as IP address servers or as gateways to IP address servers. Where multiple sources are available for the assignment of IP addresses, network elements may maintain a list of all IP address servers and/or gateways to IP address servers. In this manner, network elements and end systems may choose the IP address server and/or gateway from which it will be assigned an IP address. As another alternative, if there are multiple IP address servers in an area but specific network elements in one transport ring should use one server while network elements in another ring should use a different IP address server, the messages transmitted by a IP address server may include further identifying information for specifying network elements that are assigned to the IP address server.

Dynamically assigned IP addresses may be assigned against human readable names that identify network elements. As described above, network element 120*d* where acting as an IP address server may maintain a list of assigned IP addresses in non-volatile memory. Similarly, where an external IP address server such as external IP address server 210, the external IP address server may maintain a list of assigned IP addresses in non-volatile memory. Where desirable, it may be possible for a user to run a simple audit from the lists of IP addresses maintained by network element to ensure consistency with what network element has in its database versus what IP addresses are actually assigned to network elements. Any discrepancies identified during the audit may be flagged for human intervention. A user may then manually correct the discrepancy. Alternatively, any discrepancies identified during the audit may be automatically corrected. For example, the IP address server may be configured to automatically reclaim abandoned IP addresses.

In the various embodiments described above, IP address assignments may be considered permanent. In contrast to typical DHCP address assignments that are leased for a set period of time, dynamic IP address assignments designated by a network element 120*d* acting as an IP address server or by external IP address server 210 are permanent unless explicitly released. The assigned IP address belongs to the network element and does not have to be periodically renewed. An IP address stays with the network element until the network element relinquishes the assigned IP address. Accordingly, each new network element receiving an IP address stores the assignment in non-volatile memory. As a result, IP address assignments are able to survive network and network element resets.

Additionally, the dynamic assignment of IP address assignments by an IP address server, external or internal to the transport network, is backward compatible with network elements that are not yet OSI/IP compliant. Thus, the systems and processes described above are compatible with hybrid networks that include network elements that are OSI/IP compliant and network elements that are not OSI/IP compliant. Accordingly, the described system and operations ease the transition form OSI to mixed OSI/IP networks.

In addition to the automatic dynamic assignment of IP addresses by a designated IP address server, it may be desirable in some implementations to allow a user to manually provision IP address assignments. In a particular embodiment, manually provisioned IP address assignments may be given higher priority than dynamic IP address assignments. Thus, when a user manually assigns an IP address assignment, a network element will not request and obtain a dynamic address to replace the manually assigned IP address. Likewise, if a network element first obtains a dynamic address assignment from the IP address server and then a user manually provisions an address, the manually provisioned address may be given precedence. In such a case, the dynamic address may be returned to the address server for reassignment.

Figure 3:
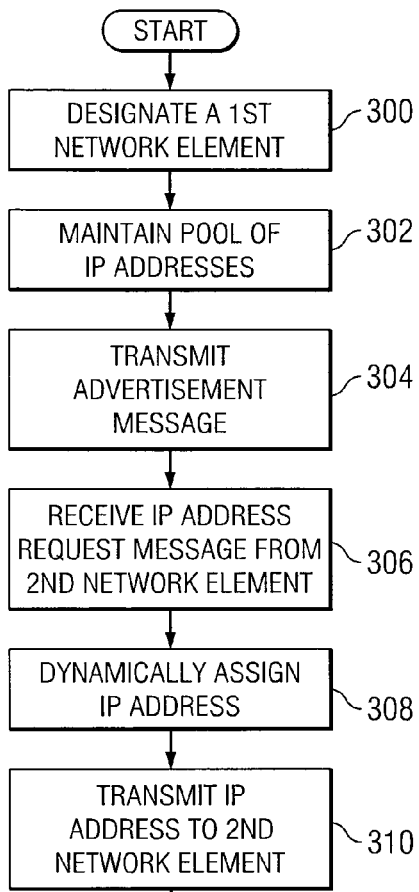
FIG. 3 is a flowchart illustrating a exemplary method for using an intermediate system network element for the dynamic assignment of IP addresses in a communication network, in accordance with an embodiment of the present invention.

FIG. 3 is a flowchart illustrating a method for using a IS network element for dynamically assigning IP address assignments in a communication network. The method begins at step 300 where a first network element is designated as an IP address server. In particular embodiments, the first network element includes an IS network element within an optical transport network. At step 302, a pool of IP addresses is maintained at the first network element. The pool of IP addresses includes unused IP addresses that may be assigned to network elements within the transport network and to end systems that communicate with the IS.

At step 304, the first network element transmits an advertisement message that identifies the first network element as providing IP address assignment services. Where the first network element is designated as an IP address server, the advertisement message may include an "IAmAnAddressServer" message that is transmitted to all network elements in the transport ring. In particular embodiments, the advertisement message may be transmitted using LSP messages. A Boolean may be added to the LSP messages that identifies to network elements receiving the advertisement message that the first network element is operating as an IP address server.

At step 306, an IP address request message is received from a second network element. In particular embodiments, the second network element also includes an IS network element within the optical transport network. When the second network element receives the advertisement message, the second network element may identify the first network element as an IP address server and generate the IP address request for delivery to the IP address of the first network element. The IP address request may be transmitted from the second network element to the first network element. In a particular embodiment, the IP address request may be transmitted using a CLNP-based message.

At step 308 and in response to receiving the IP address request message from the second network element, the first network element may use the pool of unused IP addresses to identify and assign a specific IP address to the second network element. In particular embodiments, the IP address request message may specify a type of IP address that is needed, and the first network element may identify an IP address of the type specified.

At step 310, the dynamically assigned IP address is transmitted from the first network element to the second network element. Where the network comprises an optical transport network, the dynamically assigned IP address may be transmitted to from the first network element to the second network element using a CLNP-based message that is forwarded by any intermediate network elements disposed between the first and second network elements. The second network element may then use the dynamically assigned IP address.

Figure 4:
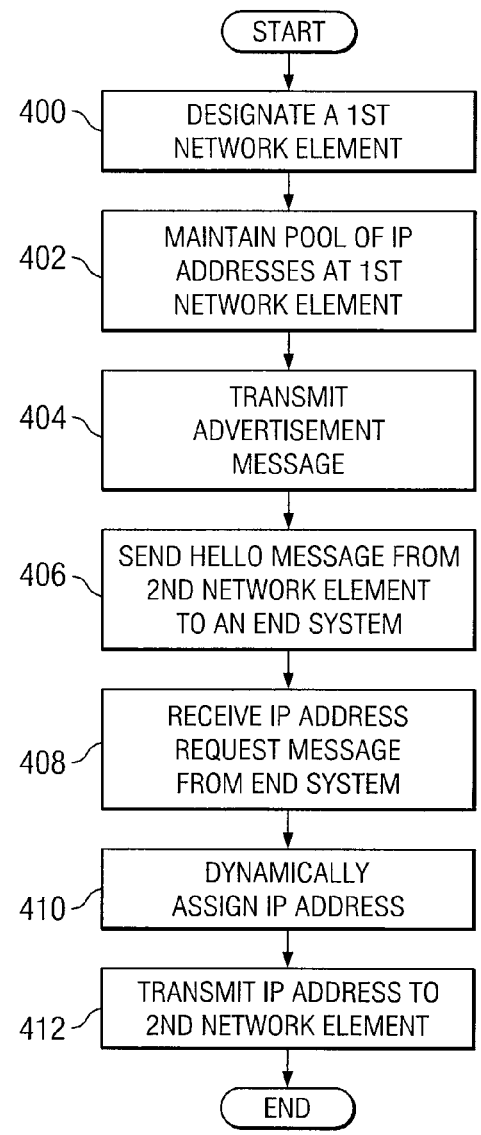
FIG. 4 is a flowchart illustrating an exemplary method for using an intermediate system network element for the dynamic assignment of IP addresses in a communication network, in accordance with an embodiment of the present invention.

FIG. 4 is a flowchart illustrating a method for using a IS network element for dynamically assigning IP address assignments in a communication network, according to an alternative scheme. The method begins at step 400 where a first network element is designated as an IP address server. In particular embodiments, the first network element includes an IS network element within an optical transport network. At step 402, a pool of IP addresses is maintained at the first network element. The pool of IP addresses includes unused IP addresses that may be assigned to network elements within the transport network and to end systems that communicate with the IS.

At step 404, the first network element transmits an advertisement message that identifies the first network element as providing IP address assignment services. Where the first network element is designated as an IP address server, the advertisement message may include an "IAmAnAddressServer" message that is transmitted to all network elements in the transport ring. In particular embodiments, the advertisement message may be transmitted using LSP messages. A Boolean may be added to the LSP messages that identifies to network elements receiving the advertisement message that the first network element is operating as an IP address server.

At step 406, a hello message is transmitted from a second network element to an end system. In particular embodiments, the second network element includes an IS network element within the optical transport network, and the end system includes a system that communicates with the second network element but is external to the optical transport network. The hello message may include typical hello message transmitted using ES-IS protocols. The hello message may be modified, however, to include data identifying the IP address of the first network element and/or data identifying the first network element as an IP address server. In response to the hello message, the end system may generate an IP address request message that is transmitted to the second network element for relay to the first network element. The second network element may relay the IP address request message to the first network element using CLNP-based messages that are forwarded by any intermediate network elements that are disposed between the first and second network elements.

At step 408, the IP address request message from the end system is received at the first network element. In response to receiving the IP address request message from the end system, the first network element may use the pool of unused IP addresses to identify and assign a specific IP address to the end system, as shown in step 410. In particular embodiments, the IP address request message may specify a type of IP address that is needed. As such, the first network element may be operable to determine the type of IP address requested and identify an appropriate IP address in the pool of IP addresses that is of the type specified.

At step 412, the dynamically assigned IP address is transmitted from the first network element to the second network element. Where the network comprises an optical transport network, the dynamically assigned IP address may be transmitted to from the first network element to the second network element using a CLNP-based message that are forwarded by any intermediate network elements disposed between the first and second network elements.

Figure 5:
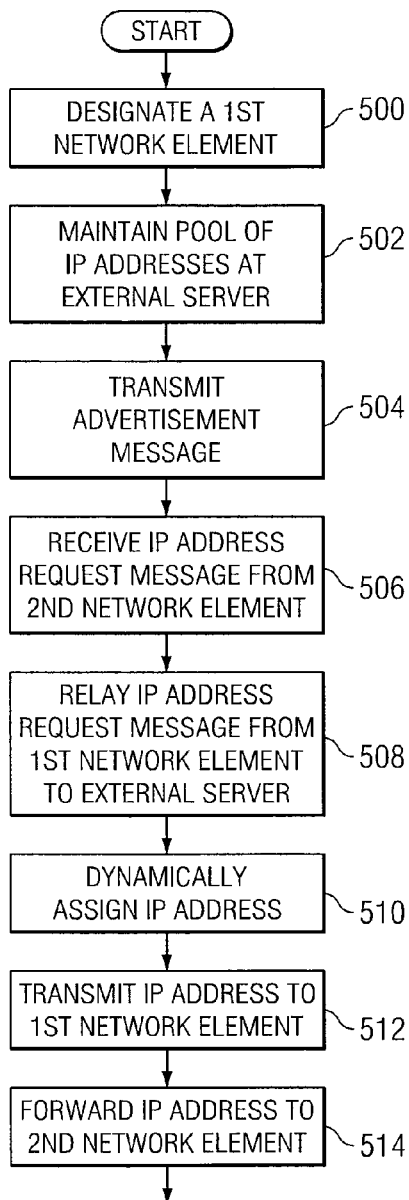
FIG. 5 is a flowchart illustrating an exemplary method for using an external IP address server for the dynamic assignment of IP addresses in a communication network, in accordance with an embodiment of the present invention.

FIG. 5 is a flowchart illustrating a method for using an external IP address server for dynamically assigning IP address assignments in a communication network. The method begins at step 500 where a first network element is designated as a gateway to an IP address server. As the gateway, the first network element operates to transmit messages and other data from a network to an external IP address server. In particular embodiments, the first network element includes an IS network element within an optical transport network, and the external IP address server includes a DHCP server. At step 502, a pool of IP addresses is maintained at the external IP address server. The pool of IP addresses includes unused IP addresses that may be assigned to network elements within the transport network and to end systems that communicate with the IS.

At step 504, the first network element transmits an advertisement message that identifies the first network element as providing IP address assignment services. The advertisement message may be transmitted to all network elements in the transport ring. In particular embodiments, the advertisement message may be transmitted using LSP messages. A Boolean may be added to the LSP messages to identify to network elements receiving the advertisement message that the first network element is operating as a gateway to an IP address server and, thus, provides IP address assignment services.

At step 506, an IP address request message is received from a second network element. In particular embodiments, the second network element includes an IS network element within the optical transport network. When the second network element receives the advertisement message, the second network element may identify the first network element as a gateway to the IP address server and generate the IP address request for delivery to the IP address server via the first network element. The IP address request may be transmitted from the second network element to the first network element using a CLNP-based message that is forwarded by any intermediate network elements that are disposed between the first and second network elements.

In response to receiving the IP address request message from the second network element, the first network element relays the IP address request message to the external IP address server at step 508. The external IP address server uses the pool of unused IP addresses to identify and assign a specific IP address to the second network element, as shown in step 510. In particular embodiments, the IP address request message may specify a type of IP address that is needed, and the first network element may identify an IP address of the type specified.

At step 512, the dynamically assigned IP address is transmitted from the external IP address server to the first network element. The first network element then forwards the IP address to the second network element. Where the network comprises an optical transport network, the dynamically assigned IP address may be transmitted to from the first network element to the second network element using a CLNP-based message that is forwarded by any intermediate network elements disposed between the first and second network elements. The second network element may then use the dynamically assigned IP address.

Figure 6:
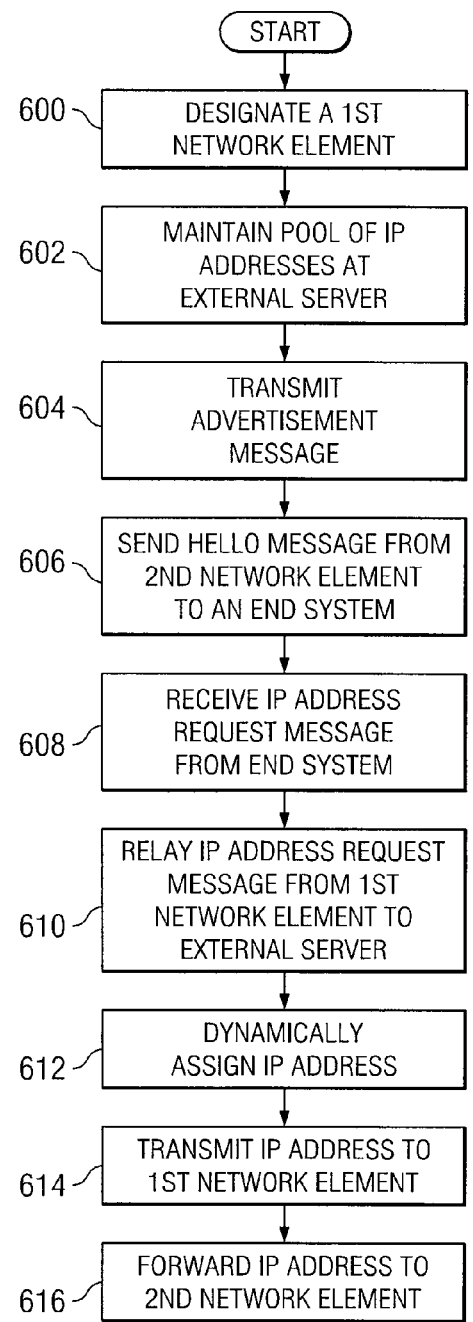
FIG. 6 is a flowchart illustrating an exemplary method for using an external IP address server for the dynamic assignment of IP addresses in a communication network, in accordance with an embodiment of the present invention.

FIG. 6 is a flowchart illustrating a method for using an external IP address server for dynamically assigning IP address assignments in a communication network, according to an alternative scheme. The method begins at step 600 where a first network element is designated as a gateway to an IP address server. As the gateway, the first network element operates to transmit messages and other data from a network to an external IP address server. In particular embodiments, the first network element includes an IS network element within an optical transport network, and the external IP address server includes a DHCP server. At step 602, a pool of IP addresses is maintained at the external IP address server. The pool of IP addresses includes unused IP addresses that may be assigned to network elements within the transport network and to end systems that communicate with the IS.

At step 604, the first network element transmits an advertisement message that identifies the first network element as providing IP address assignment services. The advertisement message may be transmitted to all network elements in the transport ring. In particular embodiments, the advertisement message may be transmitted using LSP messages. A Boolean may be added to the LSP messages to identify to network elements receiving the advertisement message that the first network element is operating as a gateway to an IP address server and, thus, provides IP address assignment services.

At step 606, a hello message is transmitted from a second network element to an end system. In particular embodiments, the second network element includes an IS network element within the optical transport network, and the end system includes a system that communicates with the second network element but is external to the optical transport network. The hello message may include typical hello message transmitted using ES-IS protocols. The hello message may be modified, however, to include data identifying the IP address of the first network element and/or data identifying the first network element as an IP address server. In response to the hello message, the end system may generate an IP address request message that is transmitted to the second network element for relay to the first network element. The second network element may relay the IP address request message to the first network element using a CLNP-based message that is forwarded by any intermediate network elements that are disposed between the first and second network elements.

At step 608, the IP address request message from the end system is received at the first network element. In response to receiving the IP address request message from the second network element, the first network element relays the IP address request message to the external IP address server at step 610. The external IP address server uses the pool of unused IP addresses to identify and assign a specific IP address to the second network element, as shown in step 612. In particular embodiments, the IP address request message may specify a type of IP address that is needed, and the first network element may identify a appropriate IP address of the type specified.

At step 614, the dynamically assigned IP address is transmitted from the external IP address server to the first network element. The first network element then forwards the IP address to the second network element at step 616. Where the network comprises an optical transport network, the dynamically assigned IP address may be transmitted from the first network element to the second network element using a CLNP-based message that is forwarded by any intermediate network elements disposed between the first and second network elements.

The proceeding diagrams and flowcharts illustrate particular methods for automatically assigning dynamic IP addresses without user interaction. However, these diagrams and flowcharts illustrate only exemplary methods of operation, and the network contemplates that the network elements described herein may use any suitable techniques, elements, and applications for performing these functions. Thus, many of the steps in the diagrams and flowcharts may take place simultaneously and/or in different orders than as shown. In addition, the network elements may use methods with additional steps or fewer steps, so long as the methods remain appropriate.

Although the present invention has been described in multiple embodiments, a myriad of changes and modifications may be suggested to one skilled in the art, and it is intended that the present invention encompass such changes and modifications as fall within the present appended claims.

What is claimed is:

1. A method for automatically assigning dynamic Internet Protocol (IP) addresses without user interaction, comprising:
   maintaining at least one pool of unused IP addresses;
   transmitting an advertisement message from a first network element to a plurality of additional network elements in a transport ring using a link state routing protocol, the advertisement message identifying the first network element as providing IP address assignment services;
   transmitting a hello message from a second network element that received the advertisement message to an end system outside the transport ring that did not receive the advertisement message, the hello message identifying the first network element as providing IP address assignment services;
   receiving an IP address request from the end system at the second network element and transmitting the IP address request from the second network element to the first network element;
   receiving, at the first network element, the IP address request message from the second network element in the transport ring transmitted using Connectionless Network Protocol (CLNP), the IP address request message sent in response to the advertisement message; and
   in response to the IP address request message, dynamically assigning an IP address from the at least one pool of unused IP addresses to the end system; and
   transmitting the dynamically assigned IP address from the first network element to the second network element.

2. The method of claim 1, wherein the at least one pool of unused IP addresses comprises a plurality of pools of unused IP addresses corresponding with a plurality of types of IP addresses, and wherein the IP address request message identifies a type of IP address.

3. The method of claim 1, wherein the dynamically assigned IP address is selected from a group consisting of an Local Communication Network (LCN) IP address, an Local Management Port (LMP) IP address, and an Network Element Management (NEM) IP address.

4. The method of claim 1, wherein transmitting the advertisement message comprises transmitting a Link State Protocol (LSP) protocol data unit (PDU) message.

5. The method of claim 1, wherein the at least one pool of unused IP addresses are maintained at an IP address server that is external to the transport ring, and the method further comprises:
   in response to receiving the IP address request message at the first network element, relaying the IP address request message from the first network element to the IP address server;
   in response to receiving the IP address request message at the IP address server, dynamically assigning the IP address from the at least one pool of unused IP addresses to an end system that is external to the transport ring that is in communication with the first network element;

receiving, at the first network element, the IP address assigned from the at least one pool of unused IP addresses by the IP address server; and transmitting the IP address to the end system.

6. A system for automatically assigning dynamic addresses without user interaction, comprising:

a database storing at least one pool of unused IP addresses;

an intermediate system comprising at least a first network element and a second network element forming at least a portion of a transport ring;

an end system outside the transport ring;

wherein the first network element is operable to:
transmit an advertisement message to the second network element using a link state routing protocol, the advertisement message identifying the first network element as providing IP address assignment services;

receive an IP address request message from the second network element in the transport ring transmitted using Connectionless Network Protocol (CLNP), the IP address request message sent in response to the advertisement message; and transmit a dynamically assigned IP address to the second network element, the dynamically assigned IP address selected from the at least one pool of unused IP addresses, wherein the second network element is operable to transmit a hello message to the end system that did not receive the advertisement message, the hello message identifying the first network element as providing IP address assignment services;

wherein the end system is operable to generate the IP address request message and the dynamically assigned IP address from the at least one pool of unused IP addresses is assigned to the end system.

7. The system of claim 6, wherein the at least one pool of unused IP addresses comprises a plurality of pools of unused IP addresses corresponding with a plurality of types of IP addresses, and wherein the IP address request message identifies a type of IP address.

8. The system of claim 6, wherein the dynamically assigned IP address is selected from a group consisting of an Local Communication Network (LCN) IP address, an Local Management Port (LMP) IP address, and an Network Element Management (NEM) IP address.

9. The system of claim 6, wherein the advertisement message comprises a Link State Protocol (LSP) protocol data unit (PDU) message.

10. The system of claim 6, wherein the database is associated with an IP address server that is external to the transport ring, and wherein the first network element is further operable to:

in response to receiving the IP address request message at the first network element, relay the IP address request message from the first network element to the IP address server;

in response to receiving the IP address request message at the IP address server, dynamically assign the IP address from the at least one pool of unused IP addresses to an end system that is external to the transport ring that is in communication with the first network element;

receive, at the first network element, the IP address assigned from the at least one pool of unused IP addresses by the IP address server; and transmit the IP address to the end system.

11. Logic for automatically assigning dynamic addresses without user interaction, the logic being embodied in a non-transitory computer-readable medium and when executed operable to:

maintain at least one pool of unused IP addresses;

transmit an advertisement message from a first network element to a plurality of additional network elements in a transport ring using a link state routing protocol, the advertisement message identifying the first network element as providing IP address assignment services;

transmit a hello message from a second network element that received the advertisement message to an end system outside the transport ring that did not receive the advertisement message, the hello message identifying the first network element as providing IP address assignment services;

receive an IP address request from the end system at the second network element and transmitting the IP address request from the second network element to the first network element;

receive the IP address request message from the second network element in the transport ring transmitted using Connectionless Network Protocol (CLNP), the IP address request message sent in response to the advertisement message; and in response to the IP address request message, dynamically assign an IP address from the at least one pool of unused IP addresses to the end system; and transmit the dynamically assigned IP address from the first network element to the second network element.

12. The logic of claim 11, wherein the at least one pool of unused IP addresses comprises a plurality of pools of unused IP addresses corresponding with a plurality of types of IP addresses, and wherein the IP address request message identifies a type of IP address.

13. The logic of claim 11, wherein the dynamically assigned IP address is selected from a group consisting of an Local Communication Network (LCN) IP address, an Local Management Port (LMP) IP address, and an Network Element Management (NEM) IP address.

14. The logic of claim 11, further operable to transmit the advertisement message comprising a Link State Protocol (LSP) protocol data unit (PDU) message.

15. The logic of claim 11, wherein the at least one pool of unused IP addresses are maintained at an IP address server that is external to the transport ring, and logic is further operable to:

in response to receiving the IP address request message at the first network element, relay the IP address request message from the first network element to the IP address server;

in response to receiving the IP address request message at the IP address server, dynamically assign the IP address from the at least one pool of unused IP addresses to an end system that is external to the transport ring that is in communication with the first network element;

receive, at the first network element, the IP address assigned from the at least one pool of unused IP addresses by the IP address server; and transmit the IP address to the end system.

* * * * *

UNITED STATES PATENT AND TRADEMARK OFFICE
CERTIFICATE OF CORRECTION

| | |
|---|---|
| PATENT NO. | : 8,295,204 B2 |
| APPLICATION NO. | : 12/035612 |
| DATED | : October 23, 2012 |
| INVENTOR(S) | : Richard J. Dunsmore et al. |

Page 1 of 1

It is certified that error appears in the above-identified patent and that said Letters Patent is hereby corrected as shown below:

In the Claims

Column 15, Line 7, Claim 6: After "dynamic" and before "addresses" insert --Internet Protocol (IP)--.

Column 16, Line 5, Claim 11: After "dynamic" and before "addresses" insert --Internet Protocol (IP)--.

Signed and Sealed this
Fourteenth Day of October, 2014

Michelle K. Lee
*Deputy Director of the United States Patent and Trademark Office*